United States Patent
Lee et al.

(10) Patent No.: US 7,353,519 B2
(45) Date of Patent: *Apr. 1, 2008

(54) METHOD AND APPARATUS FOR SIGNALING TRANSMISSION CODE SET IN DATA BROADCASTING

(75) Inventors: Doh-hyeong Lee, Yongin-si (KR); Glenn A. Adams, Cambridge, MA (US); Kwang-kee Lee, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/738,270

(22) Filed: Apr. 20, 2007

(65) Prior Publication Data

US 2007/0199003 A1    Aug. 23, 2007

Related U.S. Application Data

(63) Continuation of application No. 11/125,245, filed on May 10, 2005.

(60) Provisional application No. 60/603,564, filed on Aug. 24, 2004.

(30) Foreign Application Priority Data

| Sep. 24, 2004 | (KR) | .................. | 10-2004-0077204 |
| Mar. 2, 2005 | (KR) | .................. | 10-2005-0017361 |
| Mar. 2, 2005 | (KR) | .................. | 10-2005-0017362 |

(51) Int. Cl.
  *G06F 3/00*   (2006.01)
  *G06F 13/00*  (2006.01)
  *H04N 7/24*   (2006.01)
  *H04N 7/52*   (2006.01)

(52) U.S. Cl. .................... 719/315; 719/316; 725/135; 725/136

(58) Field of Classification Search ................ 719/313, 719/315, 316; 725/135, 136
See application file for complete search history.

(56) References Cited

U.S. PATENT DOCUMENTS

| 6,708,338 | B1 * | 3/2004 | Kim ............................ 725/135 |
| 6,737,992 | B1 | 5/2004 | Wolthuis |
| 7,003,783 | B2 * | 2/2006 | Skaringer et al. ............ 719/332 |

(Continued)

FOREIGN PATENT DOCUMENTS

JP    2004-21562 A    1/2004

(Continued)

OTHER PUBLICATIONS

Donald Hooper, "ISO/IEC MPEG 13818-6 DSM-CC International Standard User-to-User Interfaces," Aug. 27, 1996, pp. 1-47.*

(Continued)

*Primary Examiner*—Li B. Zhen
(74) *Attorney, Agent, or Firm*—Sughrue Mion, PLLC

(57) ABSTRACT

A method is provided for transmitting an object including data and a message to reference the data by an object carousel. The method includes inserting information in the message, wherein the information indicates an encoding system used to encode character strings within the message; and broadcasting the data and the message by the object carousel, wherein the message is a broadcast inter ORB protocol (BIOP) message.

7 Claims, 9 Drawing Sheets

U.S. PATENT DOCUMENTS

| | | | |
|---|---|---|---|
| 7,032,236 | B1 | 4/2006 | Ozkan |
| 2003/0233484 | A1 | 12/2003 | Takamura |
| 2003/0237098 | A1 | 12/2003 | Yamaguchi |
| 2005/0071889 | A1* | 3/2005 | Liang .......................... 725/139 |
| 2005/0081143 | A1* | 4/2005 | Liang .......................... 715/513 |

FOREIGN PATENT DOCUMENTS

| | | |
|---|---|---|
| KR | 2001-0041097 A | 5/2001 |
| KR | 2003-0034175 A | 5/2003 |

OTHER PUBLICATIONS

Phil Mesnier, "Attaining CORBA Interoperability Through Codeset Translation," Sep. 2002, Object Computing Inc., pp. 1-7.*

"OpenCable Application Platform Specification," Dec. 15, 2004, Cable Television Laboratories, p. 191.*

Common Object Request Broker Architecture (CORBA), v. 2.4.2, Section 13: "ORB Interoperability Architecture", Feb. 2001.

The Common Object Request Broker Architecture: Architecture and Specification, v. 2.1, Aug. 1997.

"Cooperation system of DSM-CC Data Carousel and MPEG-4 system via satellite", Nam-kyung Lee; Soo-hoan Chae; Ho-jin Lee; Ho kyum Kim; Information Technology; Coding and Computing, 2002. Proceedings. International Conference on Apr. 8-10, 2002, pp. 421-424.

* cited by examiner

FIG. 4

| Syntax | bits | Type | Value | Comment |
|---|---|---|---|---|
| ServiceGatewayInfo () { | | | | |
|   IOP::IOR() | | | + | see Table 4.3 |
|   downloadTaps_count | 8 | uimsbf | N1 | software download Taps |
|   for (i = 0; i < N1; i++) { | | | | |
|     Tap() | 8 | uimsbf | + | |
|   } | | | | |
|   serviceContextList_count | 8 | uimsbf | N2 | serviceContextList |
|   for (i = 0; i < N2; i++) { | | | | |
|     serviceContextList_data_byte | 8 | uimsbf | + | |
|   } | | | | |
|   userInfoLength | 16 | uimsbf | N3 | user info |
|   for (i = 0; i < N3; i++) { | | | | |
|     userInfo_data_byte | 8 | uimsbf | + | |
|   } | | | | |

| | Syntax | bits | Type | Value | Comment |
|---|---|---|---|---|---|
| | BIOP::DirectoryMessage() { | | | | |
| | magic | 4x8 | uimsbf | 0x42494F50 | "BIOP" |
| | biop_version.major | 8 | uimsbf | 0x01 | BIOP major version 1 |
| | biop_version.minor | 8 | uimsbf | 0x00 | BIOP minor version 0 |
| | byte_order | 8 | uimsbf | 0x00 | big endian byte ordering |
| | message_type | 8 | uimsbf | 0x00 | |
| | message_size | 32 | uimsbf | * | |
| | objectKey_length | 8 | uimsbf | N1 | |
| | for (i = 0; i < N1; i++) { | | | | |
| | objectKey_data_byte | 8 | uimsbf | + | |
| | } | | | | |
| | objectKind_length | 32 | uimsbf | 0x00000004 | |
| 540 | objectKind_data | 4x8 | uimsbf | 0x64697200 | "dir" type_id alias |
| | objectInfo_length | 16 | uimsbf | N2 | objectInfo |
| | for (i = 0; i < N2; i++) { | | | | |
| | objectInfo_data_byte | 8 | uimsbf | + | |
| | } | | | | |
| | serviceContextList_count | 8 | uimsbf | N3 | serviceContextList |
| | for (i = 0; i < N3; i++) { | | | | |
| 530 | serviceContextList_data_byte | 8 | uimsbf | + | |
| | } | | | | |
| | messageBody_length | 32 | uimsbf | * | |
| | bindings_count | 16 | uimsbf | N4 | |
| | for (i = 0; i < N4; i++) { | | | | Binding |
| | BIOP::Name(){ | | | | |
| | nameComponents_count | 8 | uimsbf | N5 | |
| | for (i = 0; i < N5; i++) { | | | | |
| | id_length | 8 | uimsbf | N6 | NameComponent id |
| | for (j = 0; j < N6; j++) { | | | | |
| 520 | id_data_byte | 8 | uimsbf | + | |
| | } | | | | |
| | kind_length | 8 | uimsbf | N7 | NameComponent kind |
| | for (j = 0; j < N7; j++) { | | | | |
| | kind_data_byte | 8 | uimsbf | + | as type_id (see Table 4.4) |
| | } | | | | |
| | } | | | | |
| | } | | | | |
| | bindingType | 8 | uimsbf | + | 0x01 for nobject<br>0x02 for ncontext |
| 510 | IOP::IOR() | | | + | objectRef see Table 4.3 |
| | objectInfo_length | 16 | uimsbf | N8 | |
| | for (j = 0; j < N8; j++)<br>{ objectInfo_data_byte | 8 | uimsbf | + | |
| | } | | | | |
| | } | | | | |
| | } | | | | |

FIG. 6

| Syntax | bits | Type | Value | Comment |
|---|---|---|---|---|
| BIOP::FileMessage() { | | | | |
| Magic | 4x8 | uimsbf | 0x42494F50 | "BIOP" |
| biop_version.major | 8 | uimsbf | 0x01 | BIOP major version 1 |
| biop_version.minor | 8 | uimsbf | 0x00 | BIOP minor version 0 |
| byte_order | 8 | uimsbf | 0x00 | big endian byte ordering |
| message_type | 8 | uimsbf | * | |
| message_size | 32 | uimsbf | N1 | |
| objectKey_length | 8 | uimsbf | + | |
| for (i = 0; i < N1; i++) { | | | | |
| objectKey_data_byte | 8 | uimsbf | | |
| } | | | | |
| objectKind_length | 32 | uimsbf | 0x00000004 | |
| objectKind_data | 4x8 | uimsbf | 0x66696C00 | "fil" type_id alias |
| objectInfo_length | 16 | uimsbf | N2 | |
| DSM::File::ContentSize | 64 | uimsbf | + | objectInfo |
| for (i = 0; i < N2 - 8; i++) { | | | | |
| objectInfo_data_byte | 8 | uimsbf | + | |
| } | | | | |
| serviceContextList_count | 8 | uimsbf | N3 | serviceContextList |
| for (i = 0; i < N3; i++) { | | | | |
| serviceContextList_data_byte | 8 | uimsbf | + | |
| } | | | | |
| messageBody_length | 32 | uimsbf | * | |
| content_length | 32 | uimsbf | N4 | |
| for (i = 0; i < N4; i++) { | | | | |
| content_data_byte | 8 | uimsbf | + | actual file content |
| } | | | | |
| } | | | | |

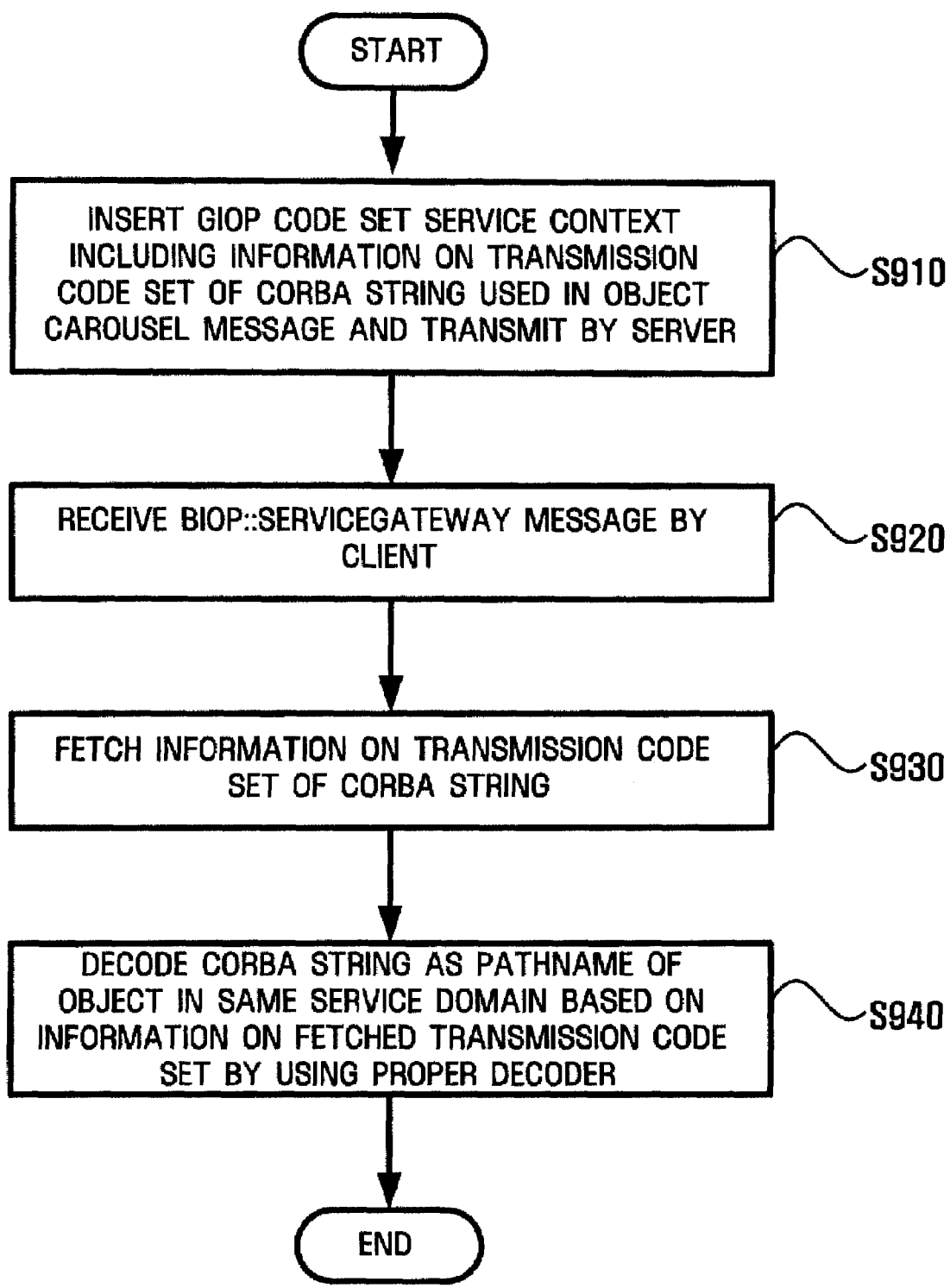

METHOD AND APPARATUS FOR SIGNALING TRANSMISSION CODE SET IN DATA BROADCASTING

CROSS-REFERENCE TO RELATED APPLICATIONS

This is a continuation of application Ser. No. 11/125,245 filed May 10, 2005, the entire disclosure application Ser. No. 11/125,245 of which is considered part of the disclosure of the accompanying continuation application and is hereby incorporated by reference. This application claims priority from Korean Patent Application No. 10-2004-0077204 filed on Sep. 24, 2004 in the Korean Intellectual Property Office, Korean Patent Application No. 10-2005-0017361 filed on Mar. 2, 2005 in the Korean Intellectual Property Office, Korean Patent Application No. 10-2005-0017362 filed on Mar. 2, 2005 in the Korean Intellectual Property Office, and U.S. Provisional Patent Application No. 60/603,564 filed on Aug. 24, 2004 in the United States Patent and Trademark Office, the disclosures of which are incorporated herein by reference in their entirety.

BACKGROUND OF THE INVENTION

1. Field of the Invention

The present invention relates to an apparatus for and a method of signaling a transmission code set, and more particularly, to an apparatus for and a method of signaling a transmission code set for naming pathnames by using various languages in transferring data about a character encoding system of a pathname in an object carousel message.

2. Description of the Related Art

Digital broadcasting is an advanced broadcasting technology that performs bi-directional data transfer, and reproduction and storage of data differently from analog broadcasting. In digital broadcasting, TV signals are compressed and broadcast as digital signals in which coded data signals are recorded. Since the number of signals than can be transferred via digital broadcasting is six times larger than in analog broadcasting, the resolution of signals in digital broadcasting is at least twice as high as in analog broadcasting. Also, because a digital radio signal can store a plurality of image and audio files, six to eight channels can be operated in the same bandwidth in digital broadcasting, in contrast to one channel in analog broadcasting. As such, digital broadcasting has become a core technology of the information era, by which image and audio files can be compressed and transferred and various signals can be modulated by using computer-based communication technologies. Accordingly, a TV in digital broadcasting is transformed from a traditionally passive device into an active multimedia device.

Data broadcasting, the main element of digital broadcasting, is the continuous transfer of digital/multimedia broadcasting contents, in addition to image files, sound files, software applications, and streaming of data to an information processing apparatus, such as a PC, a digital set top box, and a personal portable terminal. Data broadcasting does not require a return path, and the information processing apparatus receives contents without requesting them. Thus, data broadcasting is a highly advanced technology combining broadcasting methods, communication methods, and the Internet to transfer bi-directional multimedia contents at a very high speed. Therefore, data broadcasting can solve the one way property and simplicity of conventional analog broadcasting and limitations concerning image quality, tone quality, and Internet capacity broadcasting.

Examples of digital broadcasting systems include the Advanced Television Systems Committee (ATSC) system used in the U.S. and the Digital Video Broadcasting-Terrestrial (DVB-T) system used in Europe as ground wave receiving systems, and the OpenCable system used in the U.S. and the DVB-Cable (DVB-C) system used in Europe as cable receiving systems. Examples of a middle ware technology for digital broadcasting include the DVB-Multimedia Home Platform (DVB-MHP), the OpenCable Application Platform (OCAP), and the Advanced Common Application Platform (ACAP). The DVB-MHP is a middle ware system for a European digital TV designed by the DVB project. The OCAP is a middle ware system for a digital cable television set top box and other digital devices adopted by cable companies in the U.S. The ACAP has been designed to unify the OCAP used in cable broadcasting and the Digital TV Application Software Environment (DASE) used in ground wave broadcasting.

The DVB-MHP, OCAP, and ACAP use an object carousel defined by the ISO-IEC 13818-6 standard. The object carousel uses a Common Object Request Broker Architecture (CORBA) string defined in the CORBA/IIOP 2.1 specification, in order to exchange a pathname component, which is used to name data, directories, and files. In addition, when character encoding data is not specified in the CORBA string, the object carousel uses the ISO 8859-1 (ISO Latin 1) standard for the encoding system. Accordingly, these middle ware technologies using the object carousel use the ISO 8859-1 standard for a basic encoding system for naming pathnames, files, and directories. However, the DVB-MHP, the OCAP, and the ACAP support only Latin languages for the pathnames, and thus it is impossible to represent the pathnames by using another language.

SUMMARY OF THE INVENTION

The present invention provides a method of and an apparatus for reporting information about an encoding system to represent pathnames by using various languages in a system using an object carousel.

According to an aspect of the present invention, there is provided a method for transmitting an object including data and a message to reference the data by an object carousel, the method including inserting information in the message, wherein the information indicates an encoding system used to encode character strings within the message; and broadcasting the data and the message by the object carousel, wherein the message is a broadcast inter ORB protocol (BIOP) message.

BRIEF DESCRIPTION OF THE DRAWINGS

The above and other aspects of the present invention will become more apparent by describing in detail exemplary embodiments thereof with reference to the attached drawings in which:

FIG. 4 illustrates the format of ServiceGatewayInfo( ) of a downloadServerInitiate (DSI) message;

FIG. 5 illustrates the format of a BIOP::DirectoryMessage;

FIG. 6 illustrates the format of a BIOP::FileMessage;

FIG. 9 is a flowchart illustrating a method of signaling a transmission code set according to an exemplary embodiment of the present invention.

DETAILED DESCRIPTION OF EXEMPLARY EMBODIMENTS OF THE INVENTION

Figure 1:
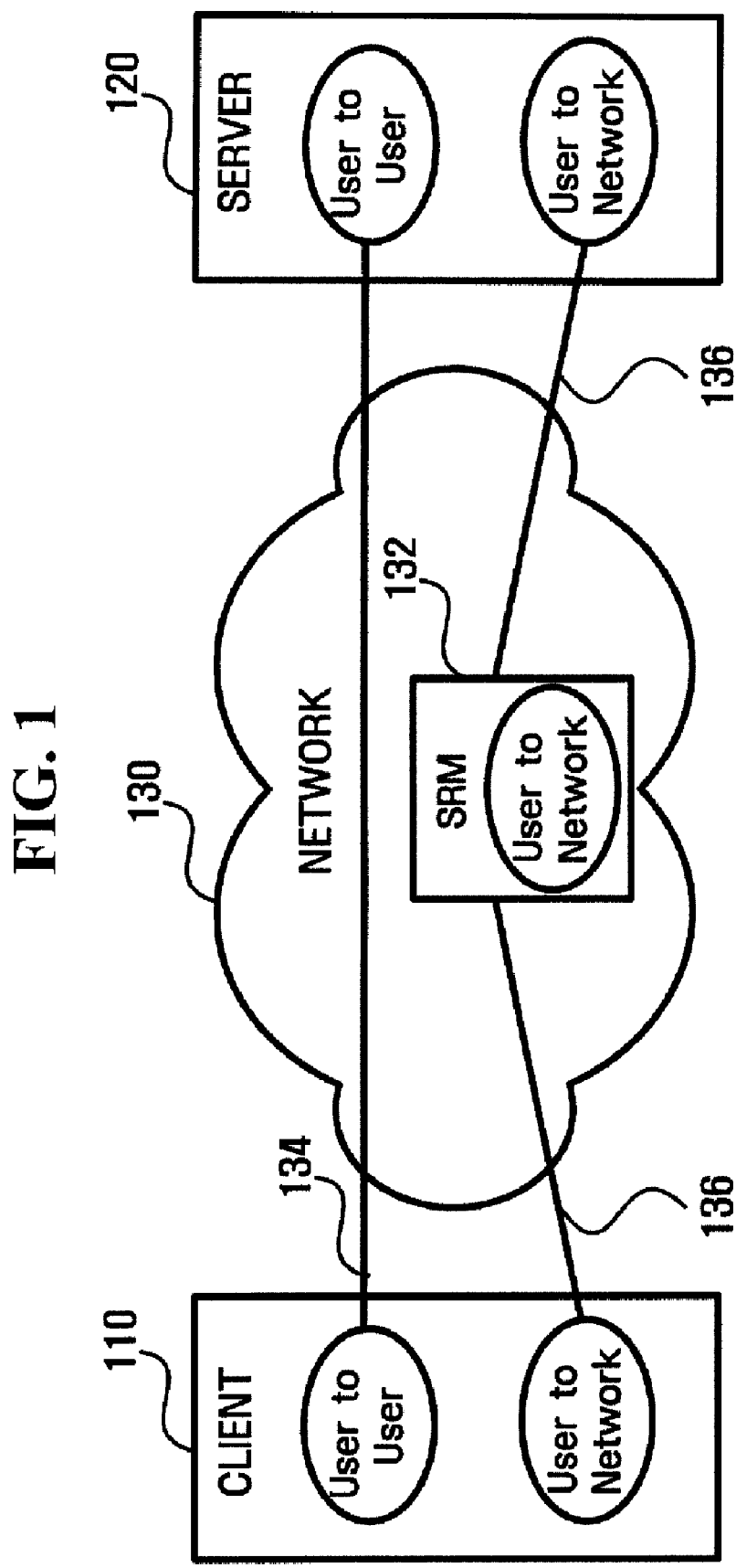
FIG. 1 is a block diagram illustrating the concept of a DSM-CC model.

The present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

The present invention will now be described more fully with reference to the accompanying drawings, in which exemplary embodiments of the invention are shown.

The digital storage media command and control (DSM-CC) standard is a set of protocols providing control functions and operations for managing MPEG-1 and MPEG-2 bit streams to transmit multimedia broadband services. The concept of the object carousel has been defined in the DSM-CC standard and reflected in a DVB specification, and then has been adopted by DVB-MHP, OCAP, and ACAP as middle ware specification for digital broadcasting.

FIG. 1 illustrates the concept of a DSM-CC model

In the DSM-CC model, streams generated by a server 120 are transmitted to a client 110, and both the server 120 and the client 110 are regarded as users. The client 110 is a set top box, a PC or a personal portable terminal which uses multimedia contents. The server 120 provides the multimedia contents and services. A network 130 denotes a set of communication elements that provides connections between users. In FIG. 1, a connection 136 for carrying user-to-network (U-N) data and a connection 134 for carrying user-to-user (U-U) data are shown. U-U information flow is used between a client and a server, and U-N information flow is used between a network and a client or between a network and a server. The DSM-CC defines a logic entity, which is referred to as a session and resource manager (SRM). In this case, an SRM 132 provides a centralized management of sessions and network resources.

A DVB system provides the transmission of MPEG-2 transport streams (TS) through various transmission media by adopting the U-U connection from the DSM-CC specifications. The MPEG-2 TS includes an MPEG-2 video and an MPEG-2 audio. Data broadcasting is regarded as a major expansion of the MPEG-2 based DVB transmission standard. Examples of data broadcasting include software download via satellites, cables, or ground links, the transmission of Internet services through broadcast channels, and interactive TV. Data information may be transmitted while being included in the MPEG-2 TS. Examples of a method of transmitting data information include data piping, data streaming, multi-protocol encapsulation, data carousel, and object carousel.

Figure 2:
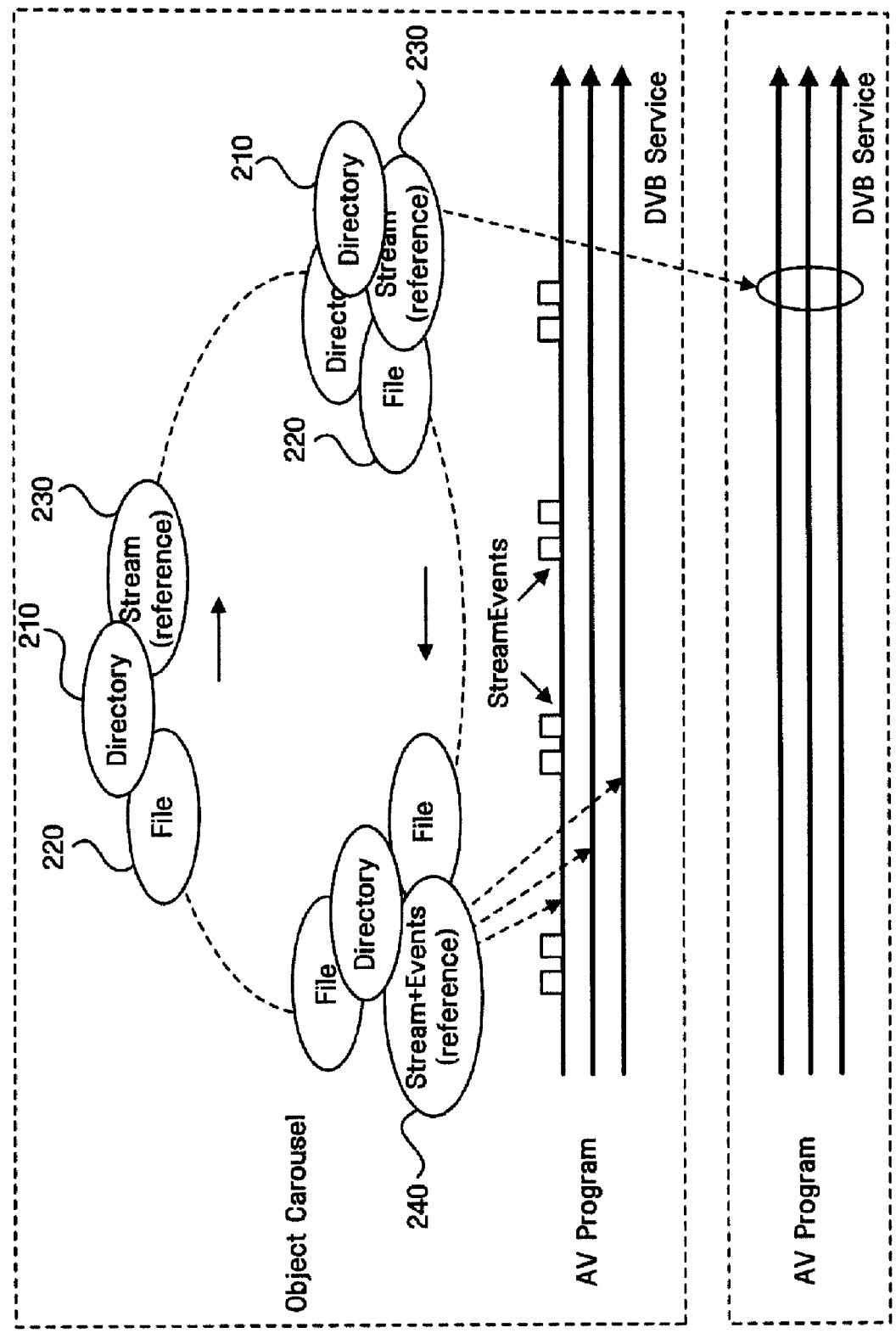
FIG. 2 illustrates a DVB service including an object carousel spectrum.

FIG. 2 illustrates a DVB service using an object carousel.

The object carousel defined by DSM-CC is a data structure supporting the transmission of object groups from a broadcasting server using a directory object, a file object, and a stream object to a broadcasting receiver. In this case, real directories and contents are located in the server. The object carousel specification supports a data broadcasting service, which demands a periodical broadcasting of a DSM-CC U-U object through a DVB compatible broadcast network. The server repeatedly inserts the objects to the DVB compatible MPEG-2 TS according to the object carousel protocol. Transmitted directories 210 and files 220 include the contents of the objects, and transmitted streams 230 are references for other streams of the broadcasting. In addition, the streams 230 may include information about DSM-CC events that are broadcast in a specific stream. The DSM-CC events may be broadcast with ordinary stream data and be used for triggering DSM-CC applications. A plurality of clients disguise the objects on the server as object implementations of clients by reading repeatedly transmitted carousel data, and thus the clients may recover the object implementations. The objects of the carousel provide to the clients a method of accessing applications and contents, which are used by the applications, as if the clients are connected to the server.

Figure 3:
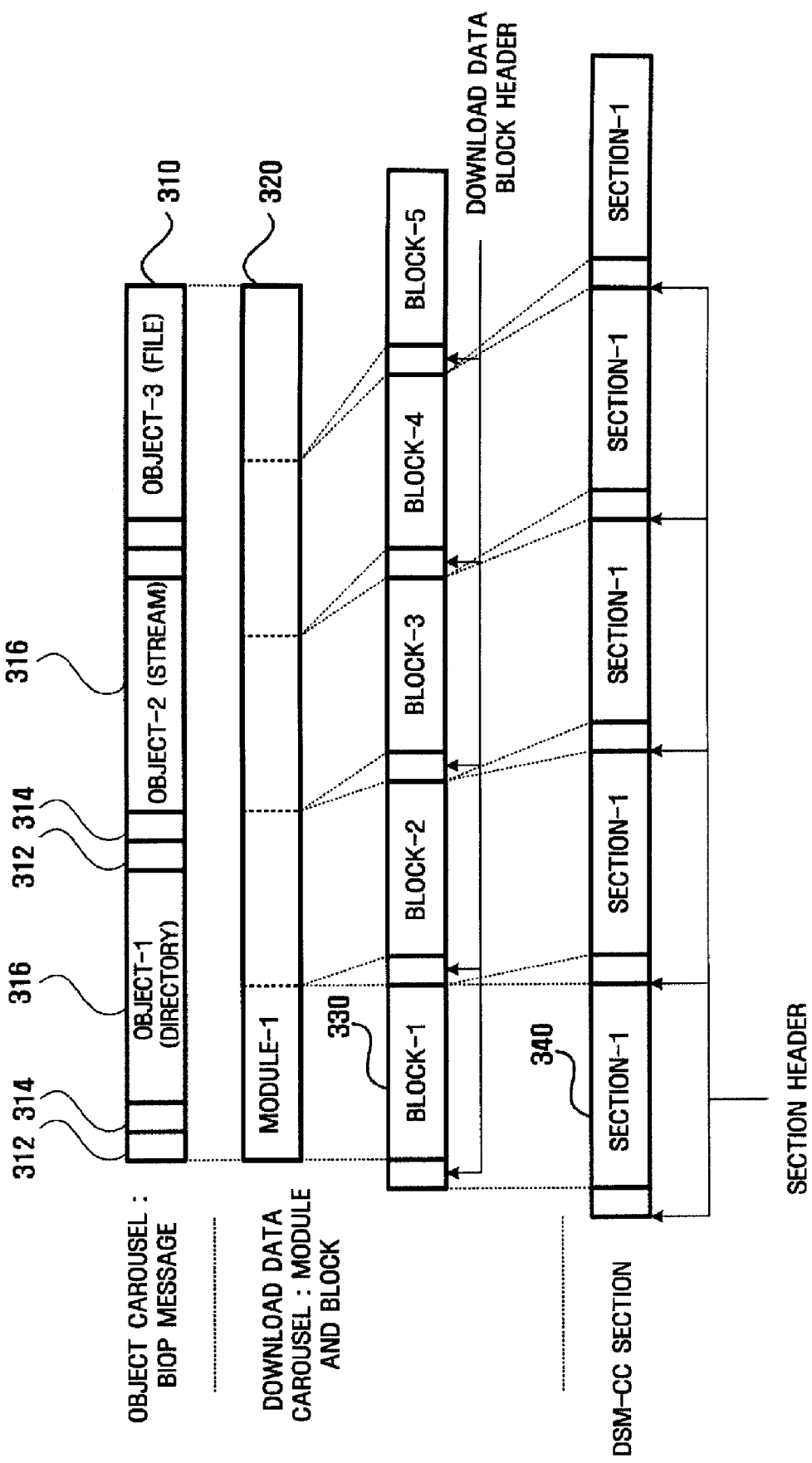
FIG. 3 illustrates the format of a BIOP message.

The data and the attribute of the U-U object in the object carousel are transmitted as a message. The message format is described using the Broadcast Inter ORB protocol (BIOP). FIG. 3 illustrates a BIOP message format. The BIOP message is formed of a message header 312, a message division header 314, and a message body 316. The message header 312 provides information about a BIOP protocol version and a BIOP message length. The message division header 314 includes information about transmitted objects, for example, object types, such as files, streams, and directories, and object key. The message body 316 includes data of the U-U object.

The BIOP message is broadcast in a data carousel module 320. In this case, one module 320 is formed of more than one connected BIOP message. Each object in one module 320 is identified by using an object key. According to the DSM-CC data carousel specification, each module is divided into more than one block. The blocks are transmitted as a DownloadDataBlock (DDB) 330. Each DDB message is sequentially transmitted as a type of an MPEG-2 section 340. The block may be obtained directly from TS by using the hardware filter of a demultiplexer. In order to obtain one object from a broadcast network, every module including the object should be obtained. Accordingly, the transmission parameters of a module, for example, a module version, a module size, a block size, timing, and a broadcast channel, should be obtained. Since the parameters are transmitted as a DownloadInfoIndication (DII) message, the DII message should be obtained prior to the module. As a result, the process of obtaining an object from a broadcast network includes obtaining a DII message and modules.

In order to obtain an object transmitted from a broadcasting stream, a DownloadServerInitiate (DSI) message is obtained and a ServiceGatewayInfo structure included in the DSI message is interpreted. The DSI message includes information about groups included in a super group. In this case, a super group is formed of more than one group, and a group is formed of more than one module.

FIG. 4 illustrates a ServiceGatewayInfo structure grammar.

An object carousel represents a specific service domain, which is a set of DSM-CC U-U objects in a DVB network. The service domain includes a service gateway, which provides a graph of a service name and an object name to a receiver.

A client obtains an Inter Operable Reference (IOR) 410, which represents the location of an object, from the ServiceGatewayInfo. The IOR 410 included in the ServiceGatewayInfo comprises the location information of a route object of an object graph in a ServiceGateway, in other words, one service domain. Since modules including a route object should be obtained to determine the route object of one service domain, a route object (BIOP::DirectoryMessage) is obtained by sequentially obtaining a DII message and a DDB message.

FIG. 5 illustrates the type of a BIOP::DirectoryMessage.

The BIOP::DirectoryMessage includes the location, the name, and the attribute of an object, which is included in a route object. An IOR field 510 includes the location information of the object, and an id_data-byte field 520 includes the name information of the object. An objectKind_data field 540 includes a value for discriminating the type of messages, and the BIOP: DirectoryMessage has "dir" according to the value.

On the other hand, when the value of the objectKind_data field 540 is "srg", the message becomes a BIOP::ServiceGateway message having the information of an object included in the route object. Accordingly, the BIOP::ServiceGateway message has the same format as the BIOP::DirectoryMessage, except for the value of the objectKind_data field 540. A serviceContextList_data_byte field 530 of the BIOP::ServiceGateway message may include a CORBA General Inter ORB Protocol (GIOP) code set context structure including information about a transmission code set of a CORBA string. The CORBA GIOP code set context structure will be described with reference to FIG. 7.

FIG. 6 illustrates the type of a BIOP::FileMessage.

A BIOP::FileMessage is a data message including a real field content. A client obtains a desired object by performing a series of IOR obtaining processes.

Figure 7:
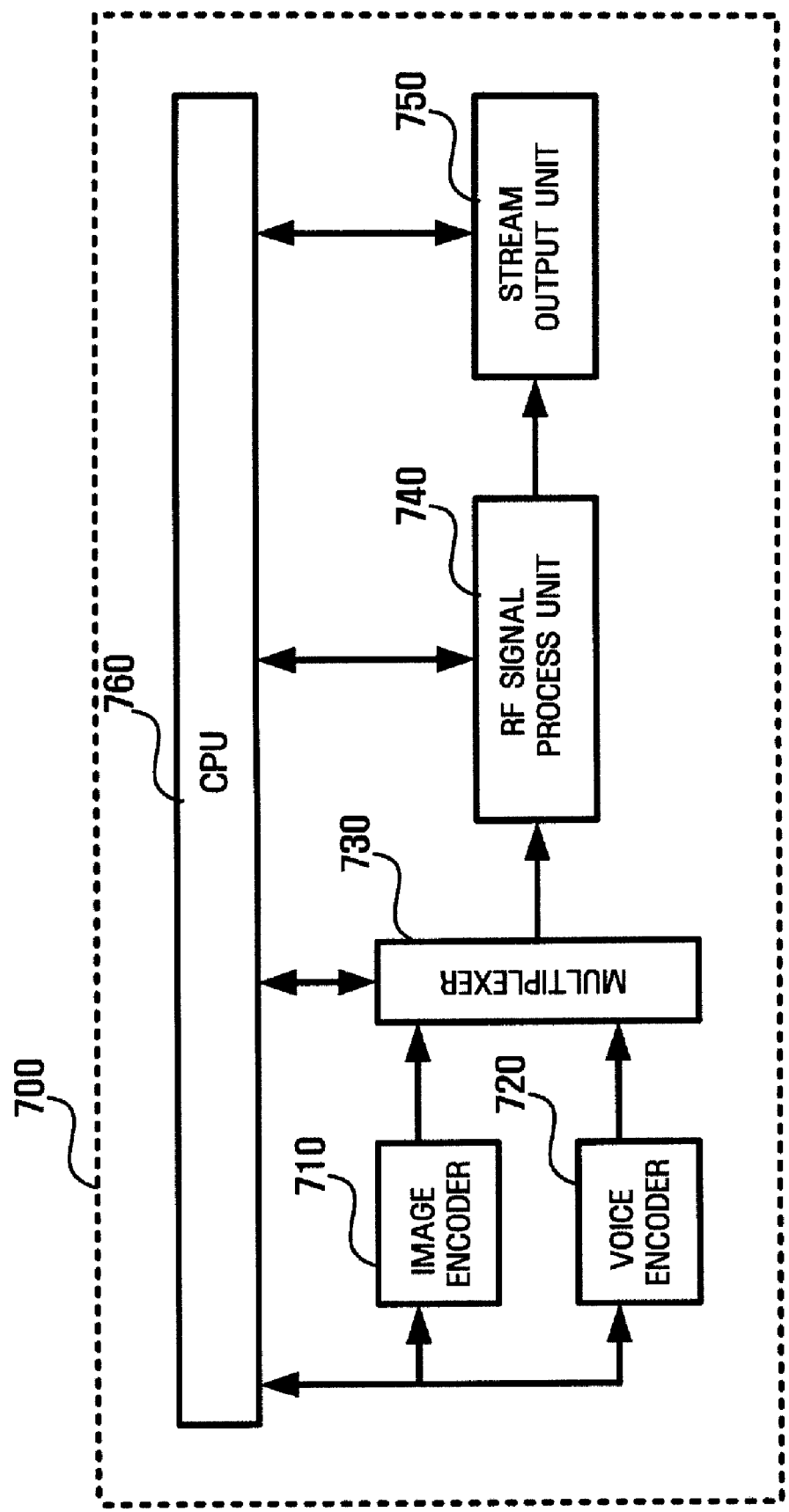
FIG. 7 is a block diagram of a server according to an exemplary embodiment of the present invention.

FIG. 7 is a block diagram of a server 700 according to an exemplary embodiment of the present invention.

The server 700 includes an image encoder 710 and a sound encoder 720 for encoding data, a multiplexer 730, an RF signal process unit 740, a transmission stream output unit 750, and a CPU 760. The image encoder 710 encodes image data and generates image bit streams which are provided to the multiplexer 730. The sound encoder 720 encodes sound data and generates sound bit streams which are provided to the multiplexer 730. The multiplexer 730 multiplexes the bit streams encoded in the image encoder 710 and the sound encoder 720 and generates one or more transmission streams which are provided to the RF signal process unit 740. The signal process unit 740 modulates the transmission streams into a signal, which can be output, and provides the signal to the transmission stream output unit 750. The transmission stream output unit 750 transmits the transmission streams. The CPU 760 controls the operations of each unit and generates object carousel messages, such as a DSI message, a DII message, and a DDB message to be loaded on the transmission streams. When using a transmission code set other than ISO 8859-1 in an object message, the CPU 760 generates a BIOP::ServiceGateway message including the information about a transmission code set.

The transmission of a character string in an object carousel follows the CORBA string, which is defined in the CORBA/IIOP 2.1 specification. Based on the CORBA/IIOP 2.1 specification, when the information about the transmission code is not explained, the CORBA string follows the ISO 8859-1 (SIO Latin 1) standard. Accordingly, the DVB-MHP, OCAP, and ACAP using the object carousel uses the ISO 8859-1 standard as a basic transmission code set for the file names and the directory names. Thus, it is required to transmit the information about the used transmission code set in order to use another transmission code set, for example, the UTF-8 transmission code set, in the CORBA string.

A character encoding rule applied to a specific CORBA string instance is determined based on the following parameters as to whether a string instance is a narrow string or a wide string: the value of a Narrow Char Transmission Code Set (TCS-C), and the value of a Wide Char Transmission Code Set (TCS-W). When the value of TCS-C is not known, the basic value of the ISO 8859-1 standard is applied. When the value of TCS-W is not known, an error occurs due to encoding or decoding a wide string, because a basic value for the TCS-W is absent. The Interface Definition Language (IDL) representation of a GIOP Code Set Service Context structure is as follows.

```
Module CONV_FRAME {
    Typedef unsigned long CodeSetId;
    Struct CodeSetContext {
        CodeSetId char_data;
        CodeSetId wchar_data;
    }
}
```

According to the CORBA/IIOP 2.1 specification, the values of the TCS-C and the TCS-W are allotted by using the GIOP Code Set Service Context. Thus, the GIOP Code Set Service Context structure of the CORBA/IIOP 2.1 specification may be selectively inserted to a serviceContextList_data_byte field 530 of the BIOP::ServiceGateway message of the object carousel in order to report the information about the CORBA string transmission code set of the object carousel to a client. In other words, when using a transmission code set other than the ISO 8859-1 standard, for example, the UTR-8 transmission code set, for the CORBA string, the TCS-C value may be set as the UTF-8 transmission code set, and the TCS-W value may be set by inserting the undefined GIOP Code Set Service Context structure to the serviceContextList_data_byte field 530 of the BIOP::ServiceGateway message. Moreover, the CORBA strings of the object carousel message may be interpreted based on the definition of the CORBA in the narrow string.

Figure 8:
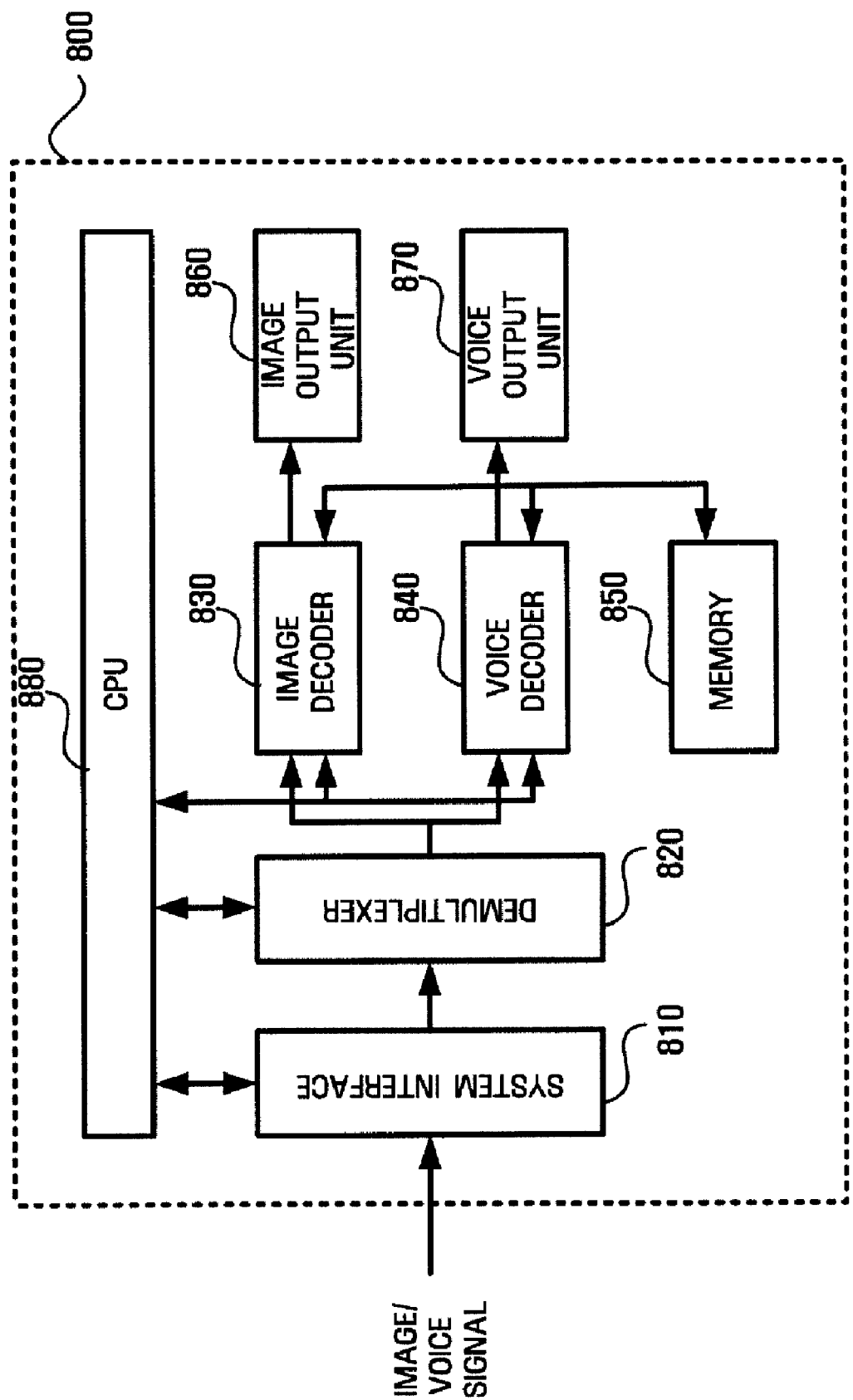
FIG. 8 is a block diagram of a client according to an exemplary embodiment of the present invention.

FIG. 8 is a block diagram of a client according to an exemplary embodiment of the present invention.

The client of FIG. 8 is a set top box of data broadcasting. A set top box 800 includes a system interface 810, a demultiplexer 820, an image decoder 830 and a sound decoder 840 as a decoding unit, a CPU 880, a memory 850, an image output unit 860, and a sound output unit 870.

The system interface 810 receives image/sound signals that are transformed into low frequency signals and modulates the received signals into image/sound signals to be emitted to a TV. In addition, the system interface 810 generates a transmission stream by descrambling the modulated image/sound signals and transmits the transmission stream to the demultiplexer 820. The demultiplexer 820 selects by using a filter a packetized elementary stream (PES) packet corresponding to a program selected by a user from the transmission stream in which a plurality of PESs are multiplexed. The image decoder 830 and the sound decoder 840 decode the PES selected by the demultiplexer 820 to transform the decoded PES into a type of stream to be emitted. Then, the image decoder 830 and the sound decoder 840 output data broadcasting through the image output unit 86 and the sound output unit 870. The memory 850 stores the PES selected by the demultiplexer 820, the decoded image signal, or the decoded sound signal. The CPU 880 controls the operations of each unit of the set top box 800 and interprets the object carousel messages, for example, the DSI message, the DII message, and the DBB message, transmitted from a server. More specifically, when the CPU 880 receives the BIOP::ServiceGateway message, the CPU 880 fetches the information about the transmission code set of the character string used in the object carousel message from the received BIOP::ServiceGateway message to decode the character string in the message by using a decoder corresponding to the transmission code set.

Each unit shown in FIGS. 7 and 8 may be realized in a hardware manner or a software manner.

FIG. 9 is a flowchart illustrating a method of sharing information about a transmission code set according to an exemplary embodiment of the present invention.

In operation S910, a server transmits the GIOP code set service context including the information about the transmission code set of the CORBA string used in an object carousel message by inserting the GIOP code set service context in a serviceContextList_data_byte field 530 of the BIOP::ServiceGateway message, and a client receives the BIOP::ServiceGateway message in operation S920. In operation S930, a CPU 880 of the client fetches the GIOP code set service context from the BIOP::ServiceGateway message to fetch the information about the transmission code set. In operation S940, the CPU 880 of the client decodes pathnames included in the message by using a proper character decoder according to the fetched transmission code set information.

While the present invention has been particularly shown and described with reference to exemplary embodiments thereof, it will be understood by those of ordinary skill in the art that various changes in form and details may be made therein without departing from the spirit and scope of the present invention as defined by the following claims.

According to the apparatus and method for signaling a transmission code set of the present invention, signaling a transmission code set for naming pathnames is allowed by using various languages in transferring data about a character encoding system of a pathname in an object carousel message.

What is claimed is:

1. A method for transmitting an object including data and a message to reference the data by an object carousel, the method comprising:

inserting information in the message, wherein the information indicates an encoding system used to encode character strings within the message; and broadcasting the data and the message by the object carousel, wherein the message is a broadcast inter object request broker (ORB) protocol (BIOP)::ServiceGateway message and the inserting the information in the message comprises inserting the information in a general inter ORB protocol (GIOP) codeset service context within the BIOP::ServiceGateway message, and wherein the character strings are common object request broker architecture (CORBA) strings defined according to CORBA/IIOP.

2. The method of claim 1, wherein the object carousel is defined according to ISO-IEC 13838-6.

3. The method of claim 1, wherein GIOP codeset service context comprises a char_data field for a narrow Char Transmission Code set and a wchar_data field for a wide Char Transmission Code Set.

4. The method of the claim 3, the information is expressed in the char_data field of the GIOP codeset service context.

5. The method of the claim 4, the wchar_data field is not defined.

6. The method of claim 5, wherein the information indicates that the character strings are encoded based on either ISO 8859-1 or UTF-8.

7. The method of claim 6, wherein the wchar_data field is not used to determine the encoding system of the character strings within the message.

* * * * *